(12) United States Patent
Inoue

(10) Patent No.: US 7,871,205 B2
(45) Date of Patent: Jan. 18, 2011

(54) BASE FOR UNDERWATER CAMERA

(75) Inventor: Akihide Inoue, Kamakura (JP)

(73) Assignee: INON, Inc., Kamakura (JP)

( * ) Notice: Subject to any disclaimer, the term of this patent is extended or adjusted under 35 U.S.C. 154(b) by 0 days.

(21) Appl. No.: 12/559,037

(22) Filed: Sep. 14, 2009

(65) Prior Publication Data

US 2010/0098404 A1    Apr. 22, 2010

(30) Foreign Application Priority Data

Oct. 21, 2008  (JP) .............................. 2008-271354

(51) Int. Cl.
  *G03B 17/00*   (2006.01)
  *G03B 17/08*   (2006.01)
(52) U.S. Cl. ............................ 396/422; 396/29; 348/81
(58) Field of Classification Search .................. 396/25, 396/27, 29, 419, 422, 428; 348/81; 294/66.2; D16/204, 242–244

See application file for complete search history.

(56) References Cited

U.S. PATENT DOCUMENTS 4,218,122 A * 8/1980 Drafahl, Jr. ................. 396/422
6,663,299 B1 * 12/2003 Shupak ....................... 396/422

* cited by examiner

*Primary Examiner*—Christopher E Mahoney
*Assistant Examiner*—Autumn Parker
(74) *Attorney, Agent, or Firm*—Weaver Austin Villeneuve & Sampson LLP

(57) ABSTRACT

A base, securely attachable to any type of watertight housing for an underwater camera without causing rotational displacement during its use for underwater photography, includes an elongated main body and a holder plate disposed on the main body which is transversely movable. The base has a protrusion for preventing transverse motion of a pedestal or a leg structure on the housing. A pair of set screws is provided in addition to a fixing screw that is passed through a fixing hole through the base main body to fasten the base to the camera housing. The base main body has a fixing hole for the fixing screw and a pair of elongated holes for passing the set screws so as to be transversely movable. The holder plate has an elongated hole for passing the fixing screw so as to be transversely movable and screw holes for engaging the set screws.

18 Claims, 19 Drawing Sheets

BASE FOR UNDERWATER CAMERA

This application claims priority on Japanese Patent Application 2008-271354 filed Oct. 21, 2008.

BACKGROUND OF THE INVENTION

This invention relates to a base for fastening and carrying thereon an underwater camera contained inside a waterproof camera housing as it is being used for flash lighting, serving to attach thereto an arm having an external flash light provided at its tip.

External flash lamps are used in underwater photography because the quantity of available light is often insufficient. Since water contains small dust particles such as grains of sand as well as planktons that float around, external lamps are often placed away from a camera with its waterproof housing that surrounds it (hereinafter referred as an "underwater camera") by distances of from ten and some centimeters to several tens of centimeters such that these dust particles, etc. will not appear conspicuously on the obtained image. For this reason, it has been known (as disclosed, for example, in Japanese Patent Publication Tokkai 11-237688) not only to fasten an underwater camera to a base but also to provide an external flash lamp at the tip of an arm and to connect the arm and the base together. In such a case, the base is a planar member to be screwed to the bottom of the housing of the underwater camera. In certain situations, a grip may be provided between the arm and the base.

FIG. 1 is a diagonal view for showing the structure of a conventional base for a general-purpose underwater camera, and FIG. 2 is a diagonal view for showing the manner in which the base of FIG. 1 may be attached to the underwater camera. For the sake of convenience, the main body of the camera is omitted in FIGS. 1 and 2, and the arm is not included in FIG. 2.

In these figures, numeral 1 indicates the base, numeral 2 indicates the waterproof camera housing (hereinafter also referred to simply as the housing), and numeral 3 indicates an arm. The bottom of the housing 2 is provided with a pedestal 4 with a screw hole 6 formed therethrough for attachment with a fixing screw 5. Leg structures 7A and 7B are further provided to the right-hand and left-hand sides of the bottom of the housing 2 for stabilizing the underwater camera.

The base 1 has an elongated hole 8 therethrough for passing therethrough the fixing screw 5 such that only its axial part (that is, the screw part and the cylindrical part that is continuously connected to it) can be freely moved in the direction of the width (hereinafter referred to as the "transverse direction"), depending on the type of the housing 2 that is being used. A protrusion 9 with a specified length is also provided at one end part of the base 1 in the direction of the width for the purpose of positioning the housing 2.

When the housing 2 is affixed to the base 1 thus structured, the axial part of the fixing screw 1 is firstly passed through the elongated hole 8 of the base 1 from below. While the tip of the fixing screw 5 has been somewhat inserted into the screw hole 6 of the housing 2, the housing 2 is moved in the direction of the width of the base 1 for its positioning by pressing the back walls of the leg structures 7A and 7B against the protrusion 9 of the base 1. After the positioning is completed, the fixing screw 5 is fully inserted into the screw hole 6. FIG. 1 shows the fully affixed condition thus achieved.

The housing 2 may be attached to the base 1 backward, as shown in FIG. 3, or in the reversed direction as compared to the attachment explained above. In this situation, the front wall of the pedestal 4 on the housing 2 comes to contact the protrusion 9 for the positioning of the housing 2.

The positioning as described above is necessary because the structure of the housing 2 varies according to the type of the camera that is being used and hence the distance between the screw hole 6 and the protrusion 9 of the base 1 or the front wall of the pedestal 4 also varies. In order to use as a general-purpose base, it is necessary that these distances be adjustable according to the type of the housing 2.

The conventional general-purpose base 1 as described above had many problem points. For example, as the user holds the housing 2 in water for underwater photography, the position of the external flash lamp must be adjusted according to the target object to be photographed if flash lighting is required. The user will carry out this adjustment by varying the angle of the external flash lamp at the tip of the arm 3 affixed to the base 1. Since the arm 3 and the external flash lamp attached to its tip are quite heavy, however, the housing 2 tends to easily undergo a rotational displacement around the leg structures 7A and 7B or the pedestal 4 in contact with the protrusion 9 of the base 1, as shown in FIG. 4. If the housing 2 thus undergoes a rotational displacement, the fixing screw 5 in contact with the bottom surface of the base 1 also rotates by the same amount, becoming loose. This makes it still easier for the housing 2 to rotate, thereby initiating a vicious cycle.

In view of this problem, it has recently been proposed to prevent the rotational displacement of the housing 2 by pasting a frictional sheet of a rubber material on the surface of the base 1 where the bottom part of the pedestal 4 of the housing 2 comes into contact such that the rotational displacement of the housing 2 can be prevented. Since the arm 3 and the external flash lamp at its tip are very heavy, however, this approach has been proved insufficient for dependably preventing the rotational displacement. Since this problem of preventing rotational displacement is distracting to the user from concentrating on the target object to be photographed, there has been a significant demand for an improvement.

Another problem associated with the conventional general-purpose base 1 has been that the loosened screw must be tightened frequently while the user is holding the equipment while being engaged in underwater photography, causing a significant stress on the user while diving.

SUMMARY OF THE INVENTION

It is therefore an object of this invention to eliminate these problems of prior art technologies by providing an improved base for an underwater camera, which can be used for different housings of different types, not causing its fixing screw to become loose during underwater photography while the user is diving, and allowing the housing to be securely affixed to the base.

In view of the object described above, this invention relates to a base for an underwater camera with a camera enclosed inside a watertight housing, serving to have the underwater camera affixed and to attach an arm with a flash lamp provided at its tip part when flash lighting is carried out and comprising a base main body having an elongated planar fixing part where the underwater camera is fastened, a mobile holder plate for fastening the underwater camera, having a protrusion for limiting displacement of the camera housing in the direction of the width of the base (defined as the transverse direction) and being disposed on the base main body so as to be movable in the transverse direction, a pair of set screws for attaching the mobile holder plate to the base main body, and a fixing screw for fastening the underwater camera, wherein the base main body has a fixing hole for allowing only an axial part of the fixing screw to pass through and a pair of elongated holes formed on both sides of the fixing hole for allowing only axial parts of the set screws to pass through and to be movable in the transverse direction, and wherein the mobile holder plate has an elongated fixing hole for allowing the axial part of the fixing screw to pass through and to be movable in the transverse direction and fixing screw holes for engaging with the pair of set screws.

Such a base may have a guide part that guides the mobile holder plate from both sides in the transverse direction.

Such a base may further comprise a pair of supplementary mobile holder plates on both sides of the mobile holder plate on the base main body, each of the pair of supplementary mobile holder plates having a protrusion on one end part in the transverse direction on a front surface, having an adjusting set screw passed through corresponding one of the elongated holes provided in the transverse direction of the base main body for adjusting its position in the transverse direction and being adapted to be fastened by sandwiching leg structure of the camera housing by inner walls of the protrusions of the pair of supplementary mobile holder plates.

In the above, each of the pair of supplementary mobile holder plates may have a backside protrusion on one end part in the transverse direction on a back surface and be adapted to be fastened as outer walls of the backside protrusions push and open the leg structures of the camera housing when the pair of supplementary mobile holder plates is inverted to be attached to the base main body.

In the above, the base main body may have supplementary guide parts formed thereon for guiding the pair of supplementary mobile holder plates from both sides in the transverse direction.

In the above, the base main body may have an arm-attaching part formed on at least one longitudinal end part thereof for attaching the arm.

In the above, the base main body may have a grip-attaching part formed on at least one longitudinal end part thereof for attaching the arm through a grip.

In the above, the base main body and the grip may be integrally formed.

The invention further relates to a base for an underwater camera with a camera enclosed inside a watertight housing, serving to have the underwater camera affixed and to attach an arm with a flash lamp provided at its tip part when flash lighting is carried out and comprising a base main body having an elongated planar fixing part where the underwater camera is fastened and a protrusion formed at one end part in the transverse direction on a front surface for preventing the camera housing from moving in the transverse direction, a pair of mobile holder plates disposed on the base main body so as to be movable in the transverse direction, each having a protrusion at one end part on a front surface in the transverse direction, a set screw for attaching each of the pair of mobile holder plates to the base main body, and a fixing screw for fastening the underwater camera, the base main body having an elongated fixing hole for allowing only an axial part of the fixing screw to pass through and to be movable in the transverse direction and a pair of elongated setting holes formed on both sides of the elongated fixing hole for allowing only axial parts of the set screws to pass through and to be movable in the transverse direction, the mobile holder plates each having an elongated fixing screw hole for engaging with the pair of set screws, and the camera housing being adapted to be fastened by sandwiching leg structures of the camera housing with inner walls of the protrusions of the mobile holder plates.

In the above, the base main body may have a guide part that guides the mobile holder plate from both sides in the transverse direction.

In the above, each of the pair of mobile holder plates may have a backside protrusion on one end part in the transverse direction on a back surface and may be adapted to be fastened as outer walls of the backside protrusions push and open the leg structures of the camera housing when the pair of mobile holder plates is inverted to be attached to the base main body.

In the above, the base main body may have an arm-attaching part formed on at least one longitudinal end part thereof for attaching the arm.

In the above, the base main body may have a grip-attaching part formed on at least one longitudinal end part thereof for attaching the arm through a grip.

In the above, the base main body and the grip may be integrally formed.

Such a base may further comprise a connecting protrusion that connects the protrusions on the pair of mobile holder plates, the connecting protrusion and the protrusions on the pair of mobile holder plates together serving to fasten the camera housing.

A base according to this invention, being characterized as above, can be used with different types of camera housings without allowing the camera-fixing screw to become loosened and without causing any rotational displacement of the housing with respect to the base while the user is engaged in underwater photography. Since the camera housing can be so securely attached to the base and the base can behave as if it had been produced especially for the individual camera housing, the user can concentrate on diving or underwater photography.

DETAILED DESCRIPTION OF THE INVENTION

Embodiments of this invention will be described next in detail.

Figure 1:
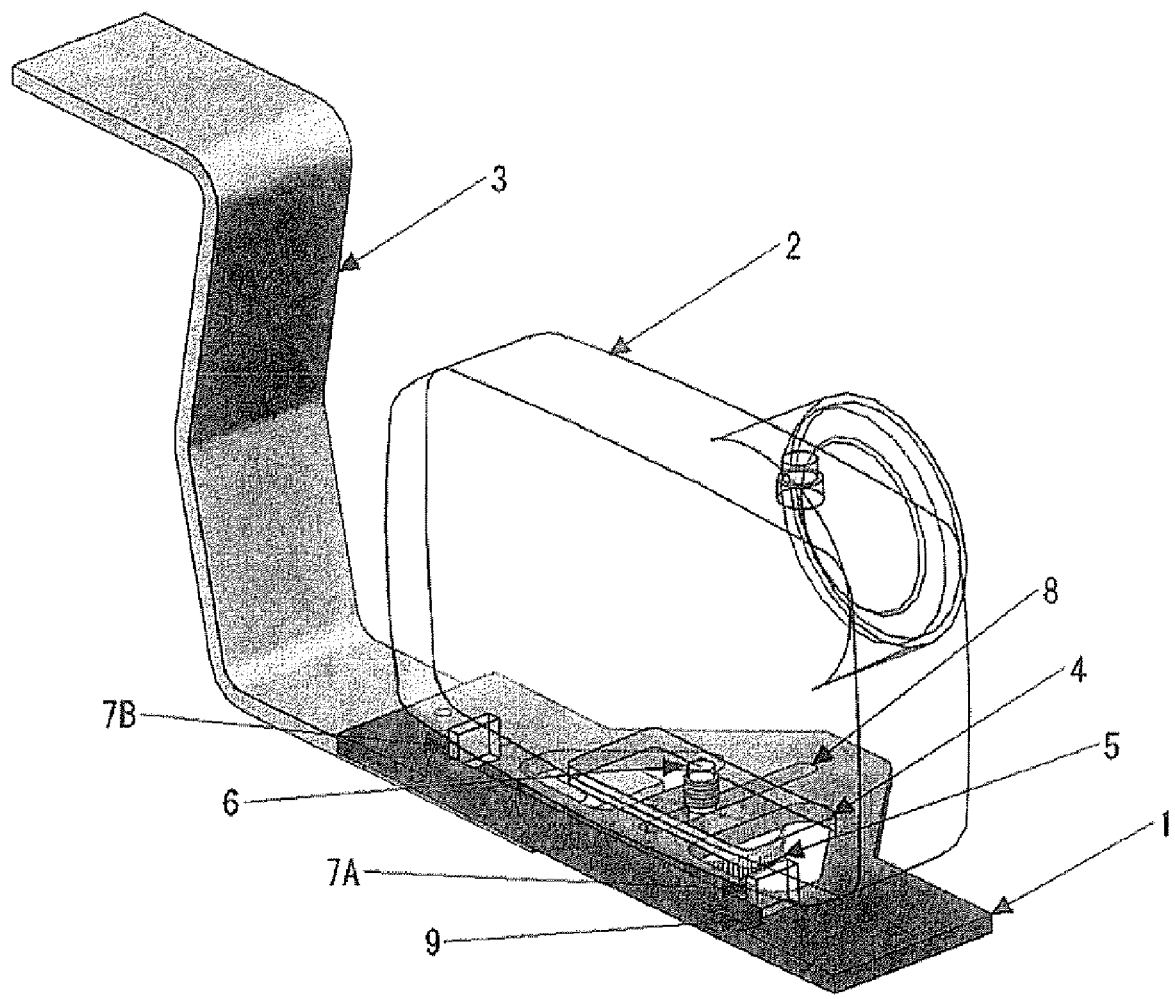
FIG. 1 is a diagonal view for showing the structure of a conventional base for a general-purpose underwater camera.
Figure 2:
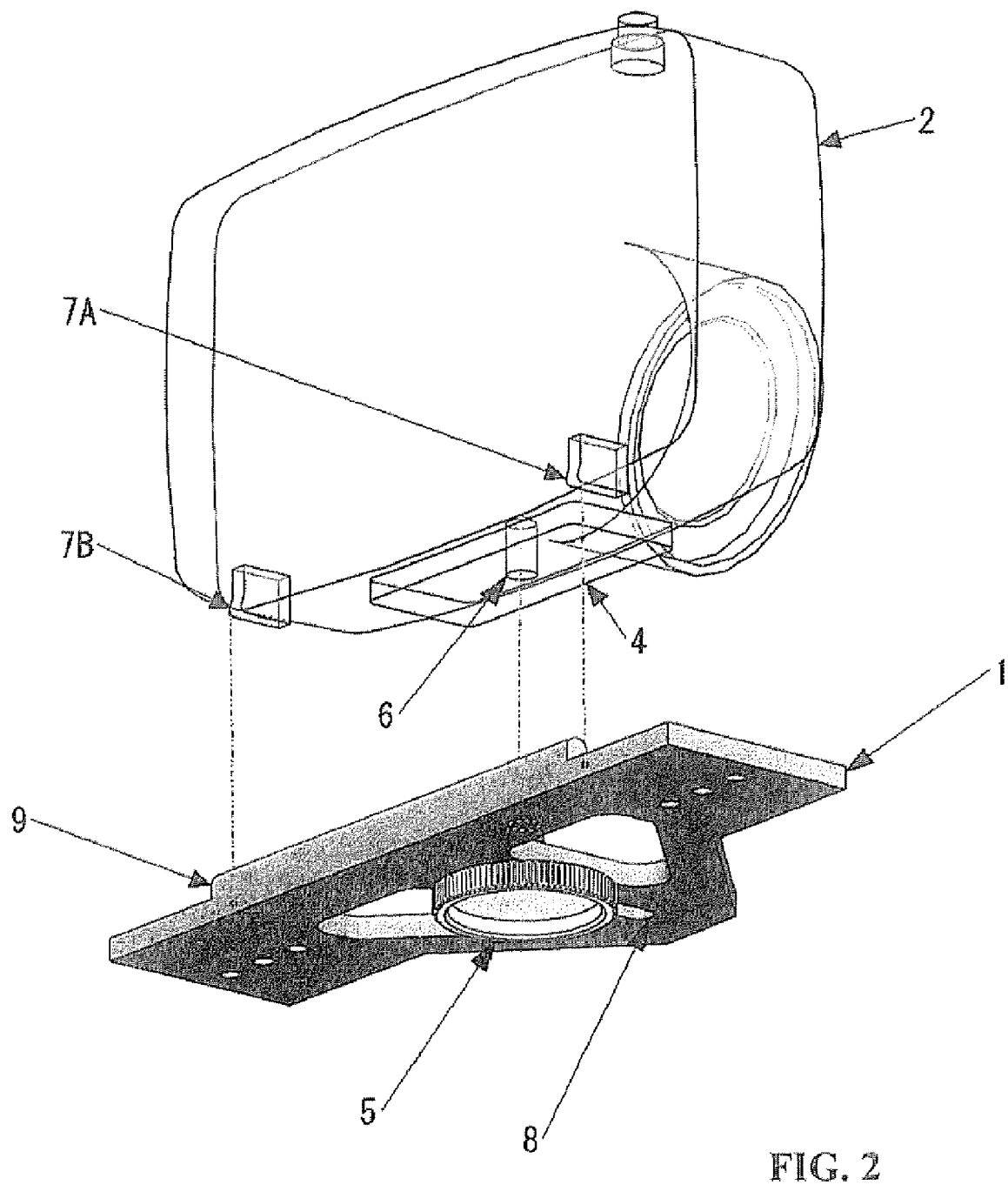
FIG. 2 is a diagonal view for showing the manner in which the base of FIG. 1 may be attached to the underwater camera.
Figure 3:
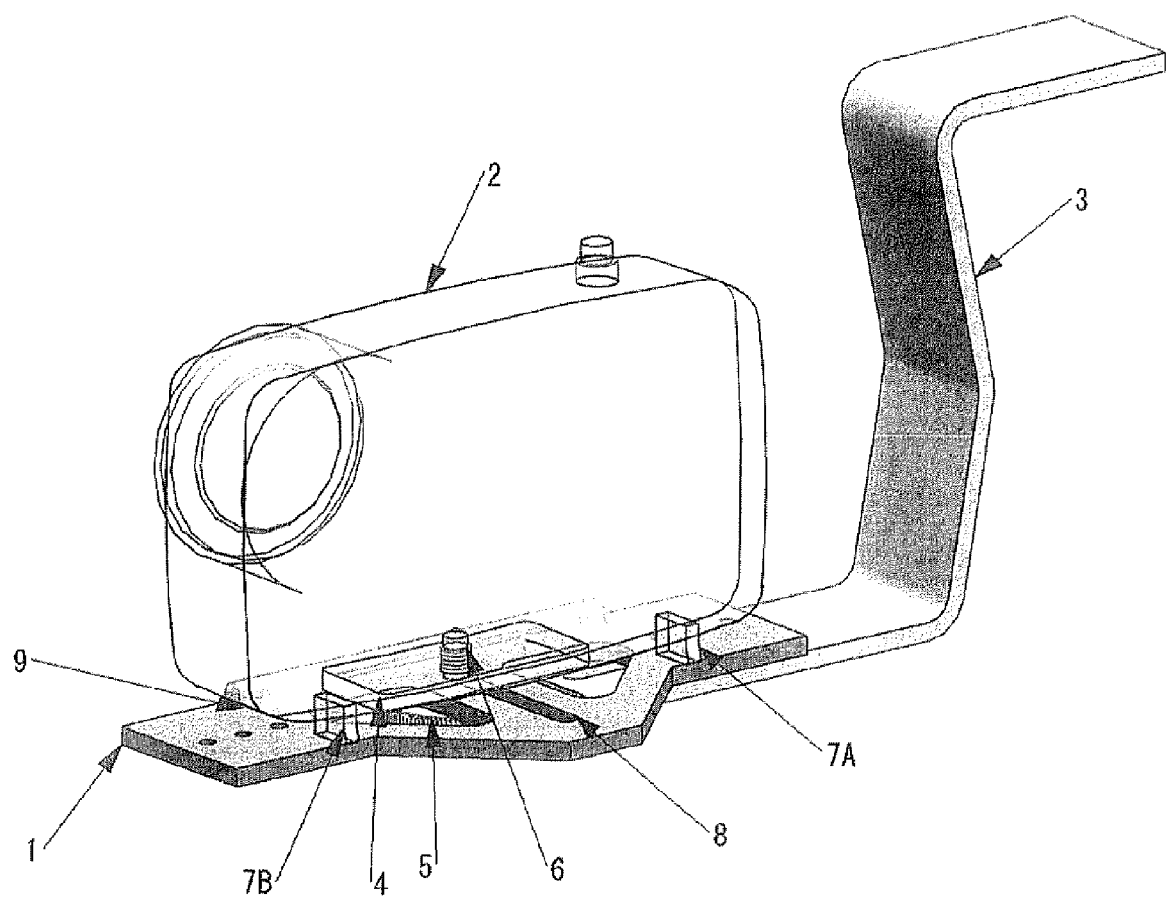
FIG. 3 is a diagonal view for showing the housing attached to the base of FIG. 1 in the reversed direction.
Figure 4:
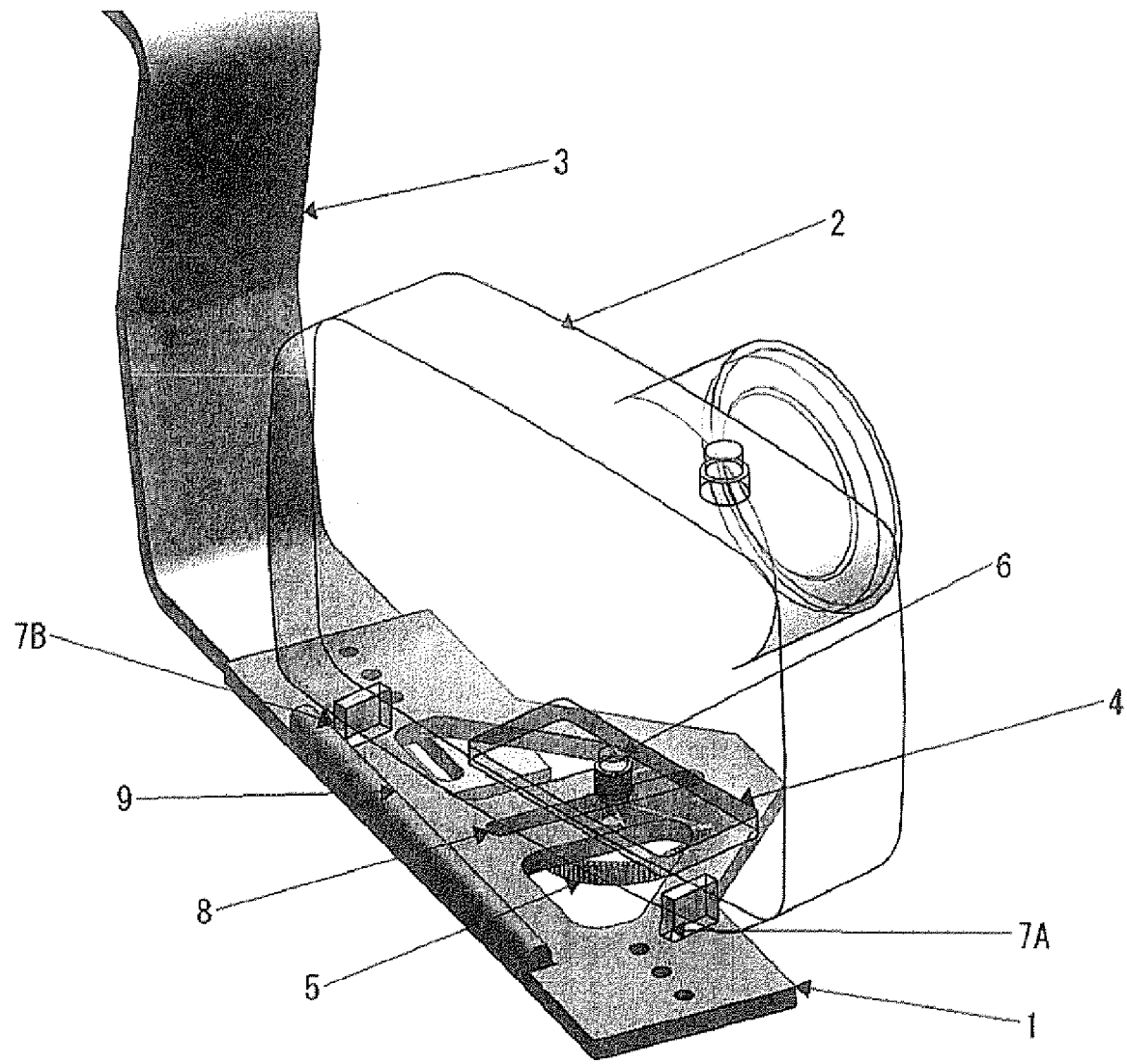
FIG. 4 is a diagonal view for showing the housing undergoing a rotational displacement.
Figure 5:
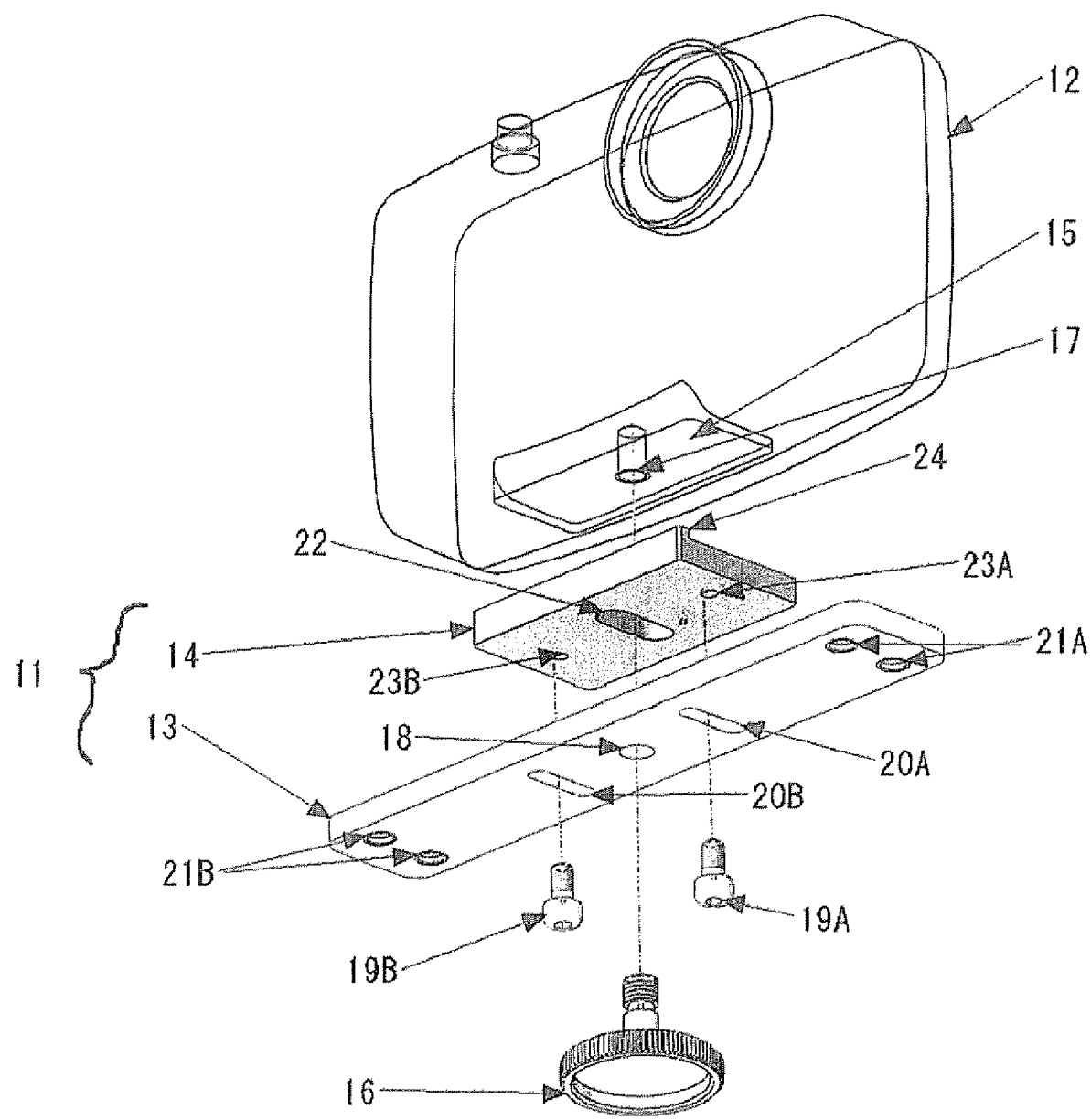
FIG. 5 is a diagonal view for explaining the structure of a base according to a first embodiment of this invention.
Figure 6:
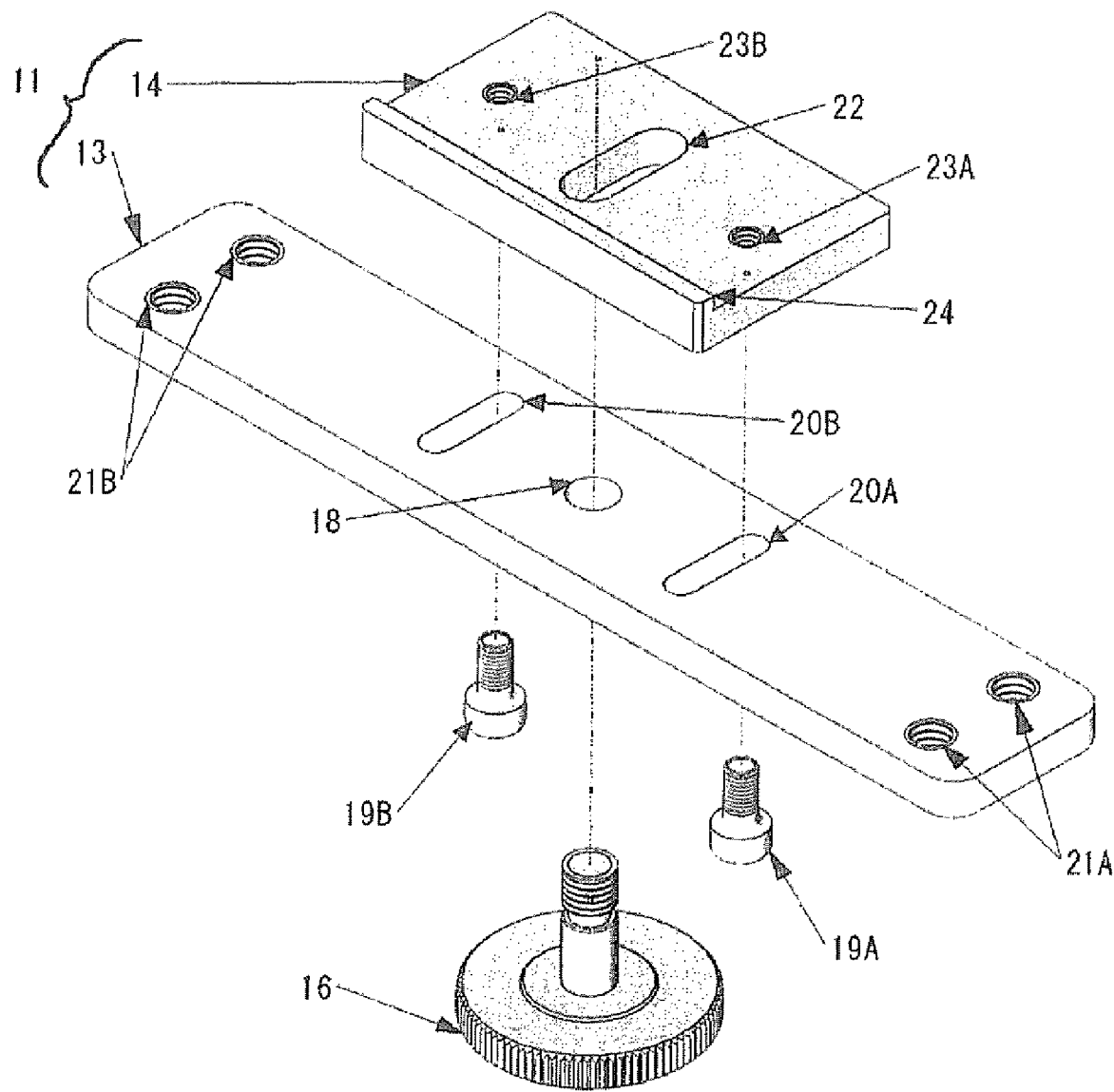
FIG. 6 is a diagonal exploded view of the base of FIG. 5 as seen from below.
Figure 7:
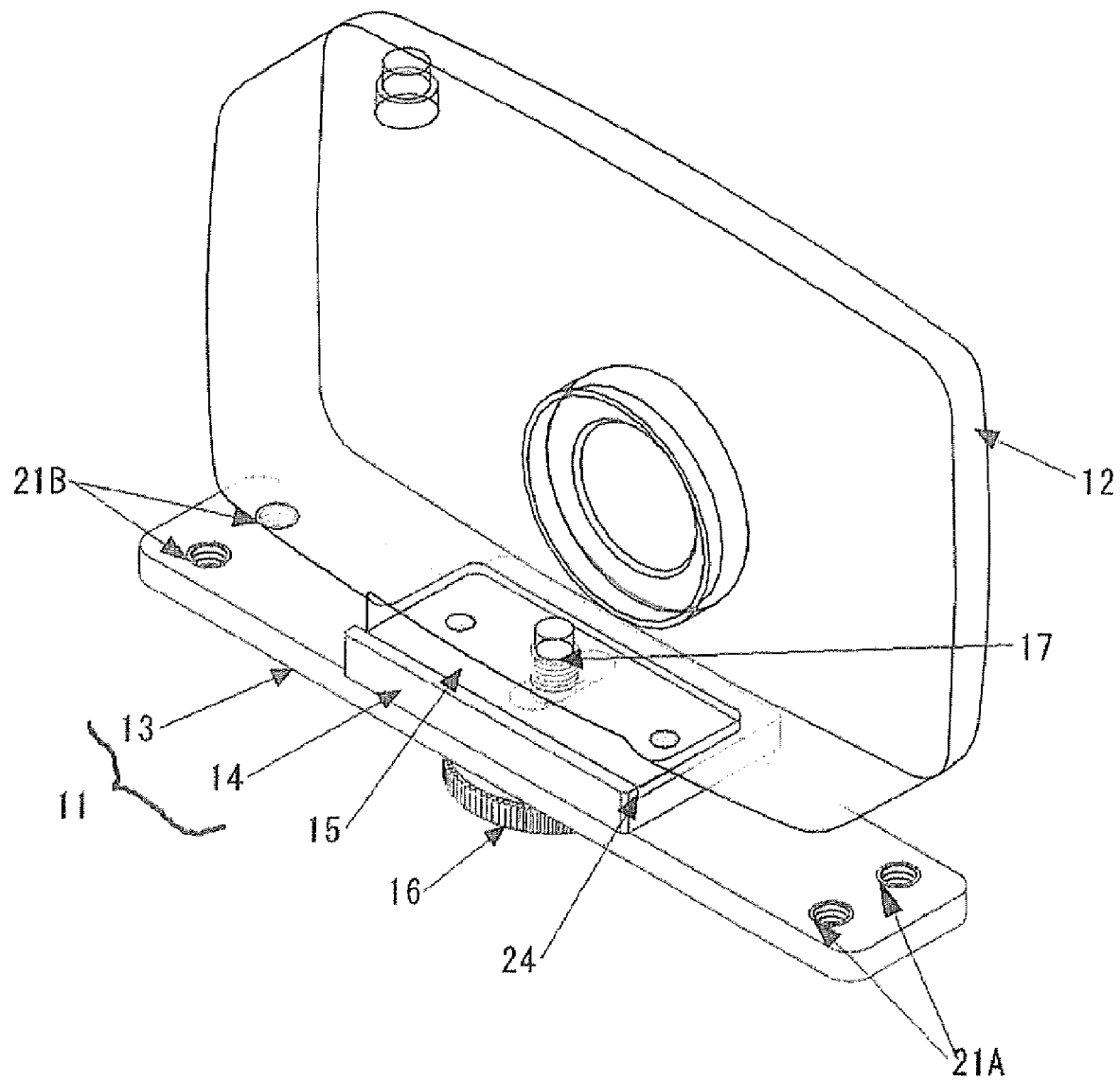
FIG. 7 is a diagonal exploded view of the base of FIG. 5 as seen from above.

FIG. 5 is a diagonal view for explaining the structure of a base according to a first embodiment of this invention, FIG. 6 is a diagonal exploded view of the same base as seen from below, and FIG. 7 is a diagonal exploded view of the same base as seen from above. A situation in which an arm is attached to the base through a grip will be explained with reference to these figures. It is to be noted that the main body of the camera is omitted from FIG. 7, and the grip and the arm are omitted from FIGS. 5-7.

In FIGS. 5-7, numeral 11 indicates the base, and numeral 12 indicates a watertight camera housing. The base 11 comprises an elongated planar main body 13 and a planar mobile holder plate 14 which is shorter than the base main body 13 in the longitudinal direction.

The bottom part of the housing 12 is provided with a pedestal 15 for fastening to the base 11, and a camera-fixing screw hole 17 is formed near the center of this pedestal 15 for accepting a fixing screw 16. This screw hole 17 may be of a type for fastening a tripod screw.

The base main body 13 is formed with a circular camera-fixing hole 18 for allowing only the axial part of the fixing screw 16 to pass through and also a pair of elongated holes 20A and 20B for set screws on both sides of this circular fixing hole 18 in the longitudinal direction, elongated in the direction of the width of the base main body 13 (hereinafter also referred to as the "transverse direction"), for allowing only the axial parts of a pair of set screws 19A and 19B such that they can be moved in the direction of the width of the base main body 13. Screw holes 21A and 21B for attaching a grip are also provided on both ends of the base main body 13.

The mobile holder plate 14 is provided nearly at its center with an elongated hole 22, elongated in the direction of the width, for allowing the axial part of the fixing screw 16 to pass through so as to be able to move in the direction of the width and a pair of circular holes 23A and 23B on both sides of this elongated hole 22 in the longitudinal direction for screwing in the pair of set screws 19A and 19B. The circular hole 18 and the pair of elongated holes 20A and 20B formed in the base main body 13 are located so as to match the elongated hole 22 and the pair of circular holes 23A and 23B formed in the mobile holder plate 14. A protrusion 24 is formed at one end part on the surface of the mobile holder plate 14 in the direction of its width so as to extend in the longitudinal direction for contacting the front wall of the pedestal 15 of the housing 12 for the purpose of positioning.

The base 11 as described above may be fastened to the housing 12, for example, as follows. Firstly, the axial part of the set screw 19A is passed through the elongated hole 20A from the lower side of the base main body 13 so as to enter the hole 23A below the mobile holder plate 14 for temporary holding. Similarly, the axial part of the other set screw 19B is passed through the elongated hole 20B from the lower side of the base main body 13 so as to enter the other hole 23B below the mobile holder plate 14 for temporary holding. By these operations for temporary holding, the mobile holder plate 14 come to be fixed on the base main body so as to be movable in the direction of the width. Under this condition, the head parts of the pair of set screws 19A and 19B are in contact with the back surface of the base main body 13, while the axial parts of these set screws 19A and 19B are prevented from moving in the longitudinal direction although they can freely move in the direction of the width.

Next, the housing 12 is placed above the mobile holder plate 14, and the mobile holder plate 14 is moved slidingly in the direction of the width such that the front wall of the pedestal 15 comes to contact the protrusion 25. Then, the axial part of the fixing screw 16 is passed sequentially through the circular camera-fixing hole 18 of the base main body 13 and the elongated hole 22 of the mobile holder plate 14. Next, not only the camera-fixing screw 16 but also the pair of set screws 19A and 19B is tightened completely under the condition that the axial positions of the fixing screw 16 and the screw hole 17 of the pedestal 15 of the housing 12 are matched. As a result, the movement of the housing 12 in the direction of the width is limited by the protrusion 24 of the mobile holder plate 14 and the fixing screw 16 while its longitudinal movement is limited since the pair of set screws 19A and 19B is inserted into the elongated holes 20A and 20B. In other words, no rotational displacement is allowed to occur.

Although the first embodiment of the invention was explained above by way of an example with a housing having a pedestal and using a grip while not having any leg structure, it goes without saying that this is not intended to limit the scope of the invention. The invention is intended to include situations where leg structures are provided and an arm is directly to be attached.

Figure 8:
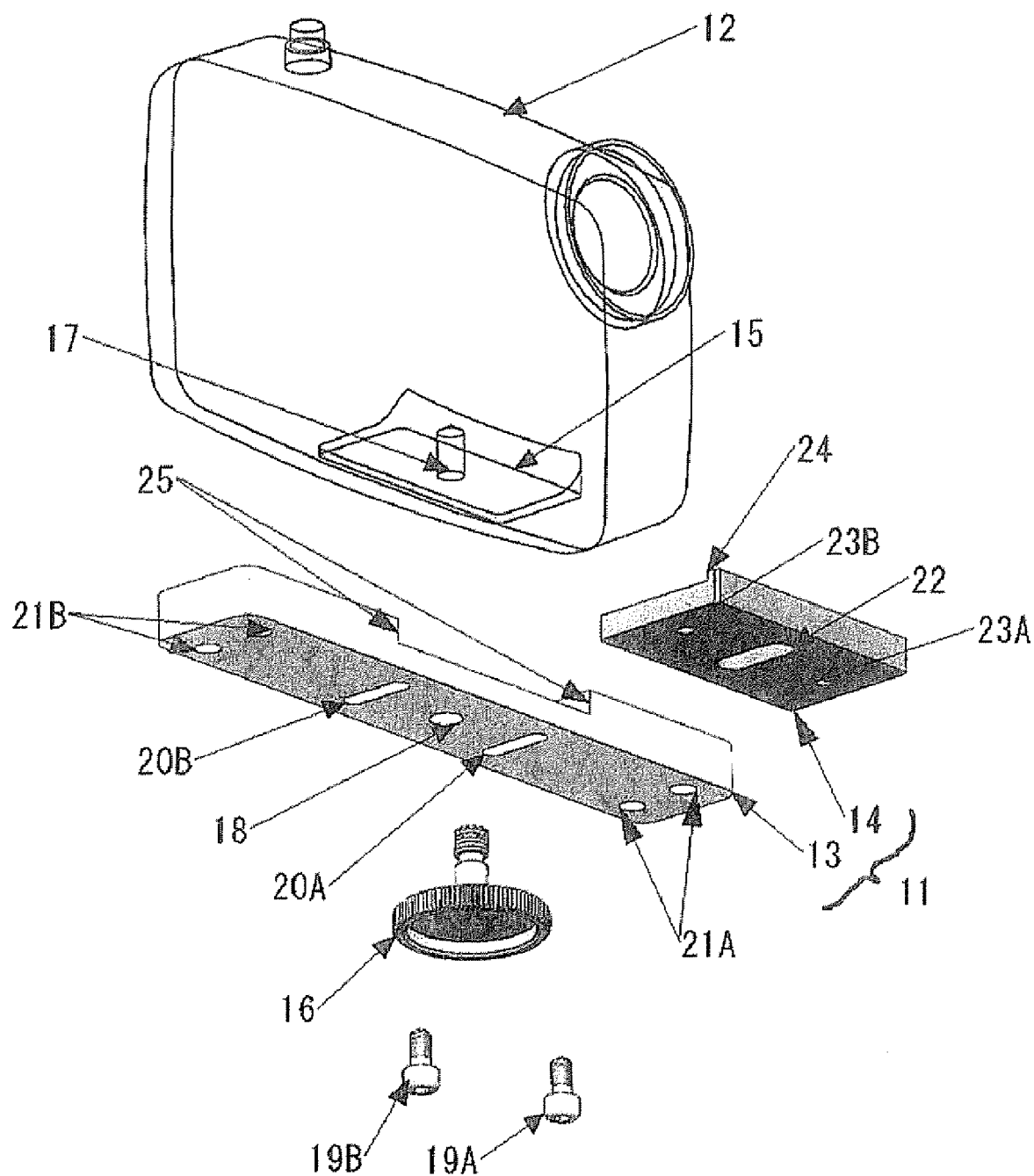
FIG. 8 is an exploded diagonal view for explaining the structure of a base according to a second embodiment of this invention as seen from below.
Figure 9:
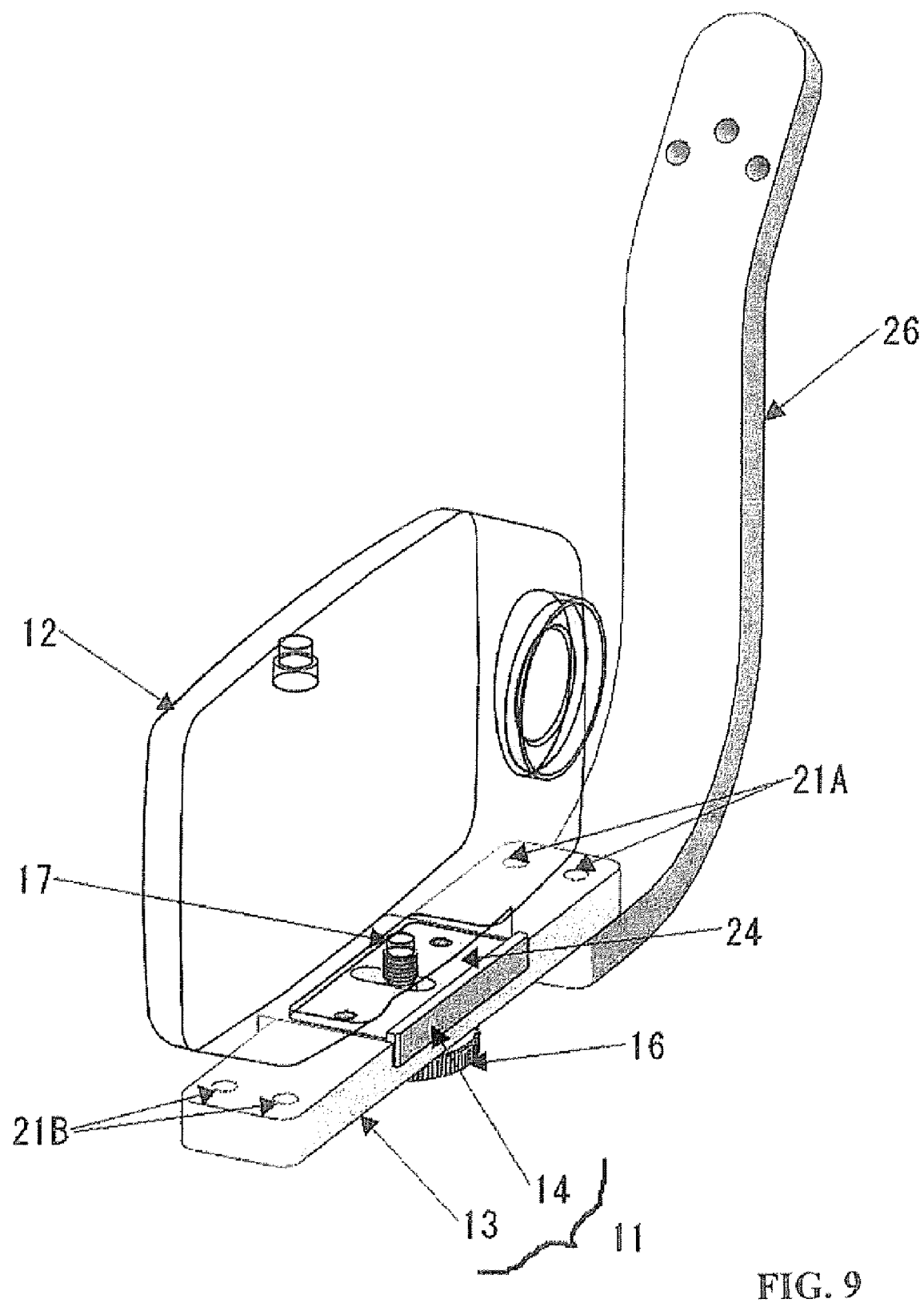
FIG. 9 is a diagonal view showing a camera housing attached to the base of FIG. 8.

Next, a second embodiment of the invention is described. FIG. 8 is an exploded diagonal view for explaining the structure of a base for an underwater camera according to the second embodiment of the invention as seen from below, and FIG. 9 is a diagonal view showing a housing attached to this base. In these two figures, the components which are similar to or like those already explained with reference to the first embodiment of the invention are indicated by the same numerals and will not be repetitively explained. For simplifying the disclosure, the camera main body is not illustrated in FIGS. 8 and 9.

The base 11 according to this embodiment of the invention, like the base according to the first embodiment, comprises an elongated planar base main body 13 and a planar mobile holder plate 14 which is shorter than the base main body 13 in the longitudinal direction.

The base main body 13 according to this embodiment has a guide groove 25 formed with a shape which is complementary to the shape of the mobile holder plate 14 such that the mobile holder plate 14 can move in the direction of the width by being guided along the both wall surfaces of this guide groove 25. In other respects, the structure of this embodiment is the same as that of the first embodiment. FIG. 9 shows a situation where a grip 26 is in an attached condition.

Being thus structured, the second embodiment is advantageous, in addition to having the advantages of the first embodiment, in that the displacement of the mobile holder plate 14 in the longitudinal direction can be limited without strictly matching the measurements of the set screws 19A and 19B and the elongated holes 20A and 20B because the mobile holder plate 14 is guided by the walls of the guide groove 25. This embodiment is advantageous also because of the ease of attachment.

Figure 10:
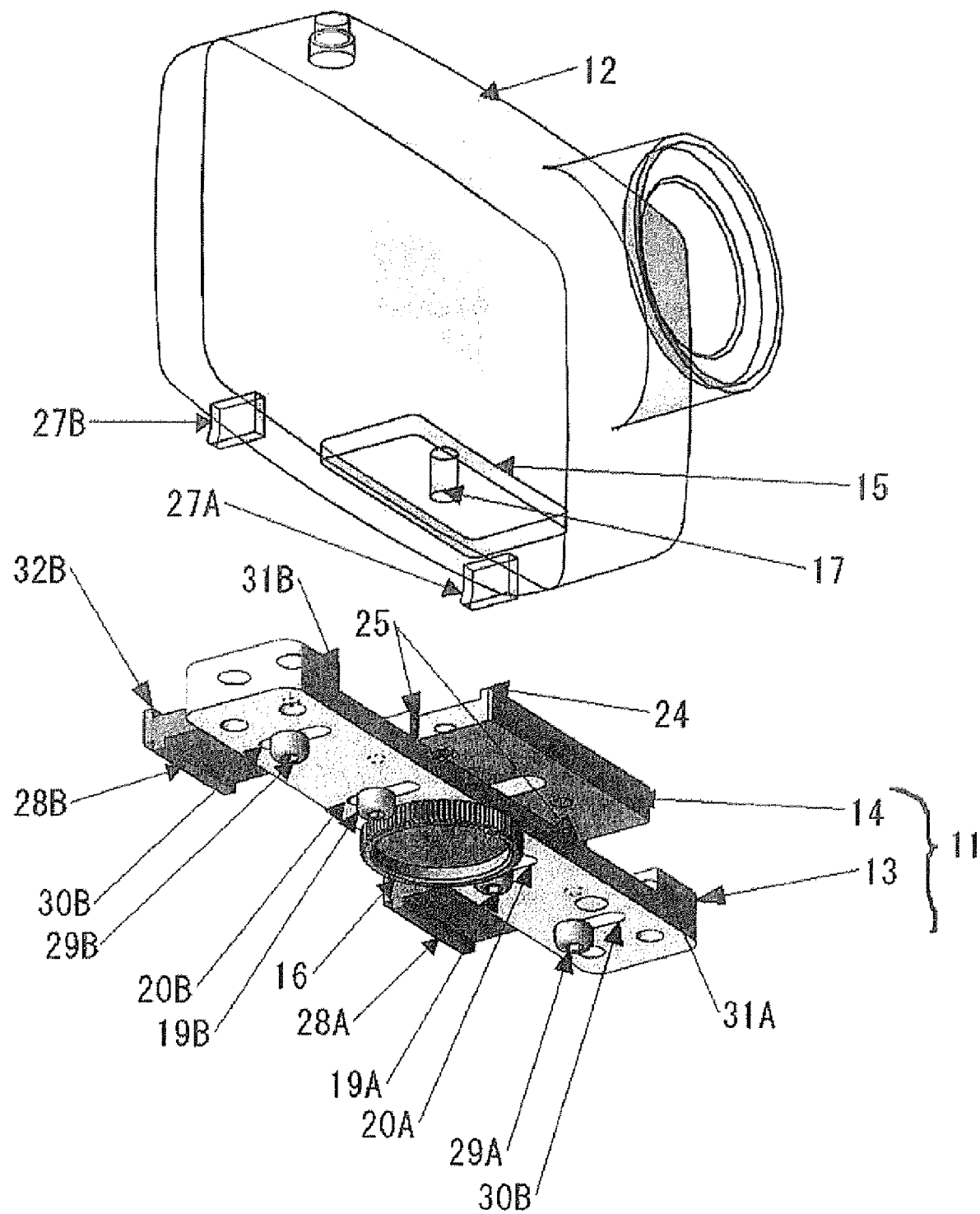
FIG. 10 is a diagonal view for explaining the structure of a base according to a third embodiment of the invention as seen from below.
Figure 11:
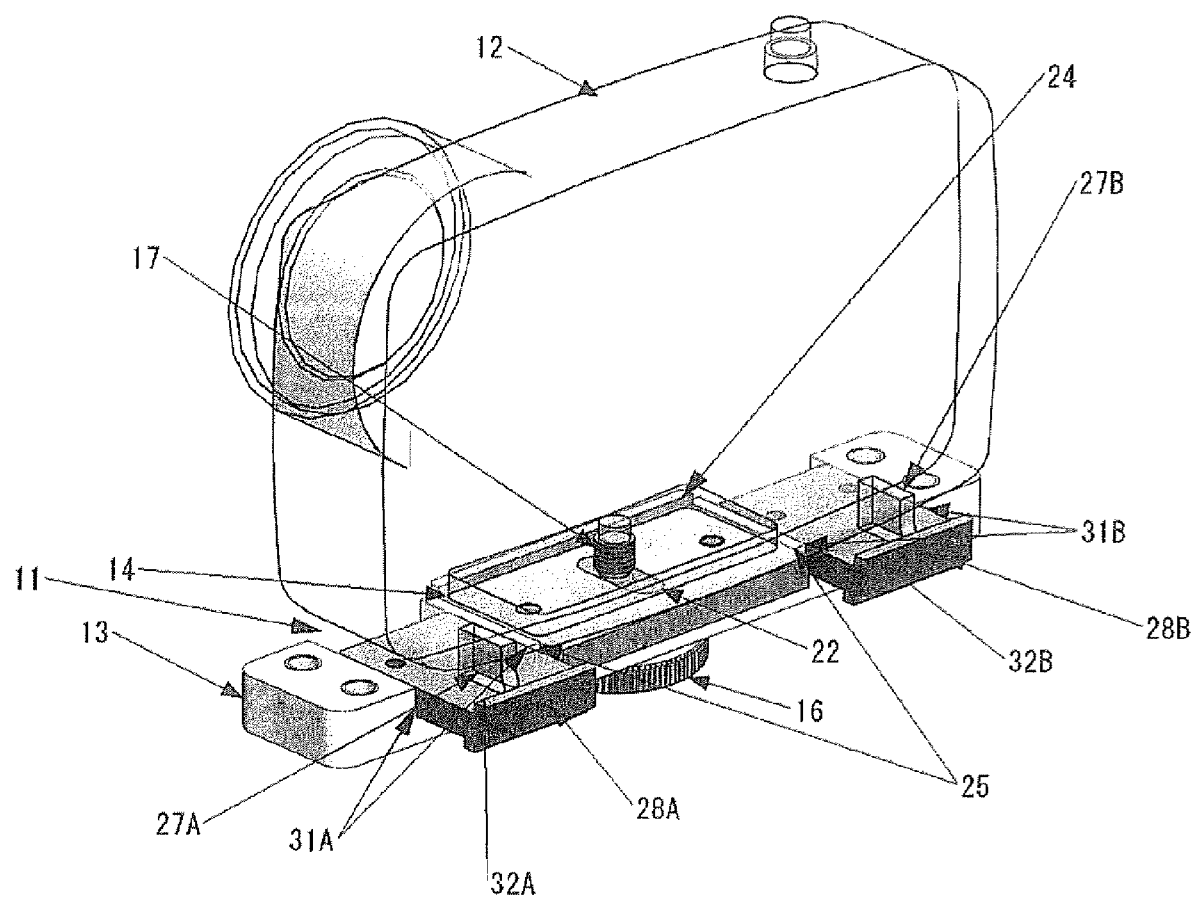
FIG. 11 is a diagonal view of the base of FIG. 10 as seen from above.

Next, a third embodiment of the invention is described. FIG. 10 is a diagonal view for explaining the structure of a base for an underwater camera according to the third embodiment of the invention as seen from below, showing the situation before the housing 12 is attached to the base 11, and FIG. 11 is a diagonal view of the same base as seen from above after the housing 12 has been attached to the base 11. In these two figures, the components which are similar to or like those already explained with reference to the first embodiment of the invention are indicated by the same numerals and will not be repetitively explained. For simplifying the disclosure, the camera main body is not illustrated in FIGS. 10 and 11.

The base 11 according to this embodiment of the invention is preferably used when the housing 12 is structured with leg structures 27A and 27B in addition to a pedestal 15 on its bottom, comprising not only an elongated planar main body 13 and a planar mobile holder plate 14 which is shorter than the base main body 13 in the longitudinal direction but also a pair of supplementary mobile holder plates 28A and 28B. For this reason, the base main body 13 has additional elongated holes 30A and 30B for set screws formed on each side of the elongated holes 20A and 20B, elongated in the direction of the width such that the axial parts of set screws 29A and 29B can be passed therethrough while allowing them to move in the direction of the width. Moreover, the base main body 13 has not only a guide groove 25 formed with a shape which is complementary to the shape of the mobile holder plate 14 but also additional guide grooves 31A and 31B on each of its sides in the shape which is complementary to the shape of the supplementary mobile holder plates 28A and 28B. The supplementary mobile holder plates 28A and 28B are movable in the direction of the width, being guided respectively by the wall surfaces of these guide grooves 31A and 31B. Protrusions 32A and 32B are formed at one end on the front surface respectively of the supplementary mobile holder plates 28A and 28B, and circular screw holes (not shown) are formed on the back surfaces for the set screws 29A and 29B. The length of the supplementary mobile holder plates 28A and 28B in the longitudinal direction is shorter than that of the mobile holder plate 14. The supplementary mobile holder plates 28A and 28B are disposed such that the protrusions 32A and 32B are on the side opposite to the protrusion 24 of the mobile holder plate 14. The housing 12 is fastened such that the leg structures 27A and 27B are sandwiched by the front walls of the protrusions 32A and 32B of the supplementary mobile holder plates 28A and 28B.

A base thus structured will have not only the advantages described above but also the advantage of being capable of making the fastening even securer, and this additional advantage will be particularly demonstrated when the housing 12 is large.

Figure 12:
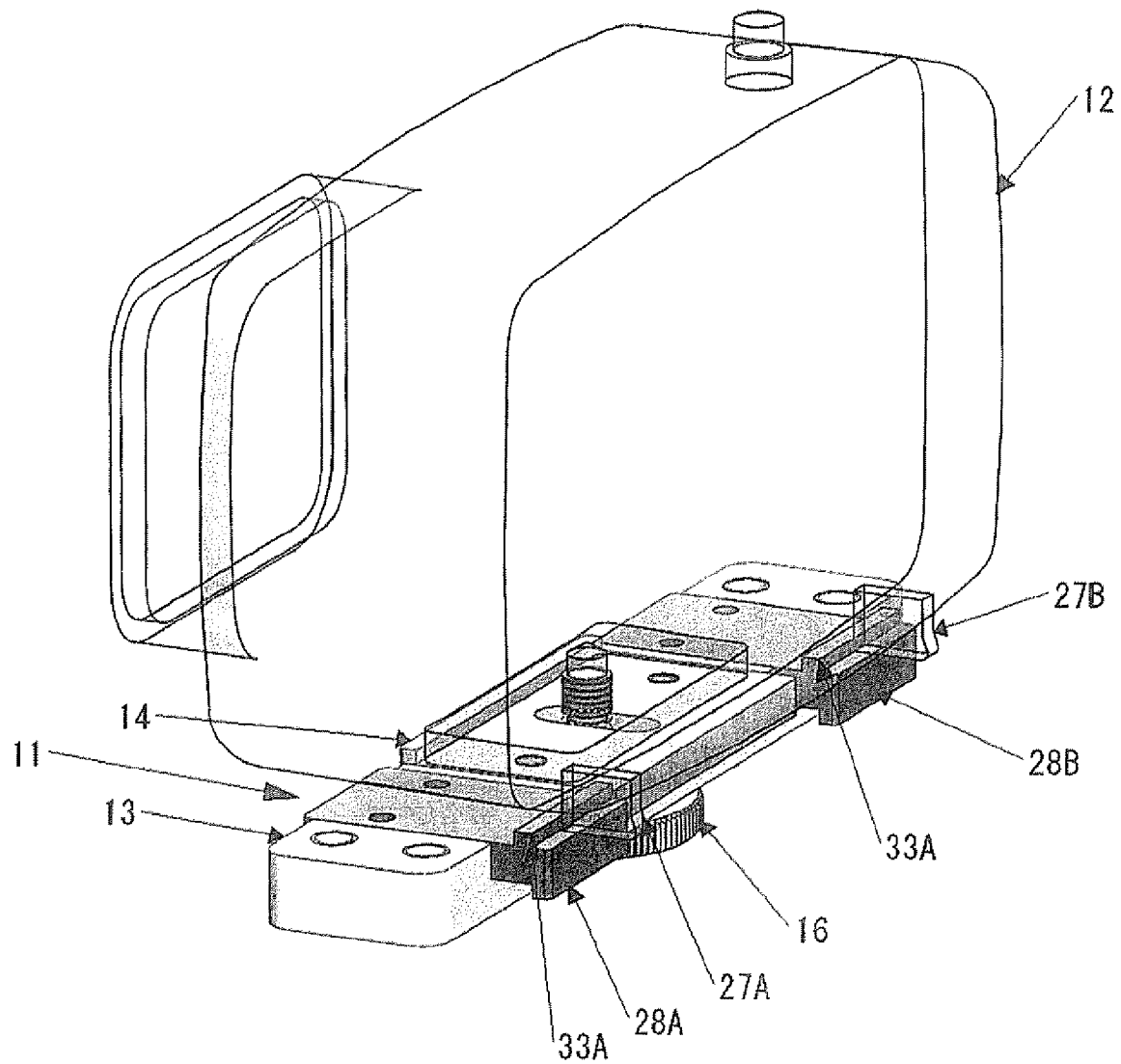
FIG. 12 is a diagonal view of a base for an underwater camera which is preferably usable with a large camera housing.

FIG. 12 shows a base 11 which is preferable for using with a large housing. This example is characterized wherein the pair of supplementary mobile holder plates 28A and 28B is provided with protrusions 33A and 33B at places somewhat removed inwardly from one end part of the back surface in the direction of the width such that it can be fastened by turning the pair of supplementary mobile holder plates 28A and 28B around to attach them to the base main body 13 and by opening the leg structures 27A and 27B of the housing 12 wider with the outer walls of the protrusions 33A and 33B on the back surfaces of the pair of supplementary mobile holder plates 28A and 28B.

The screw holes to be provided to the pair of supplementary mobile holder plates 28A and 28B are preferably throughholes such that any of the protrusions 32A, 32B, 33A and 33B can be used.

Figure 13:
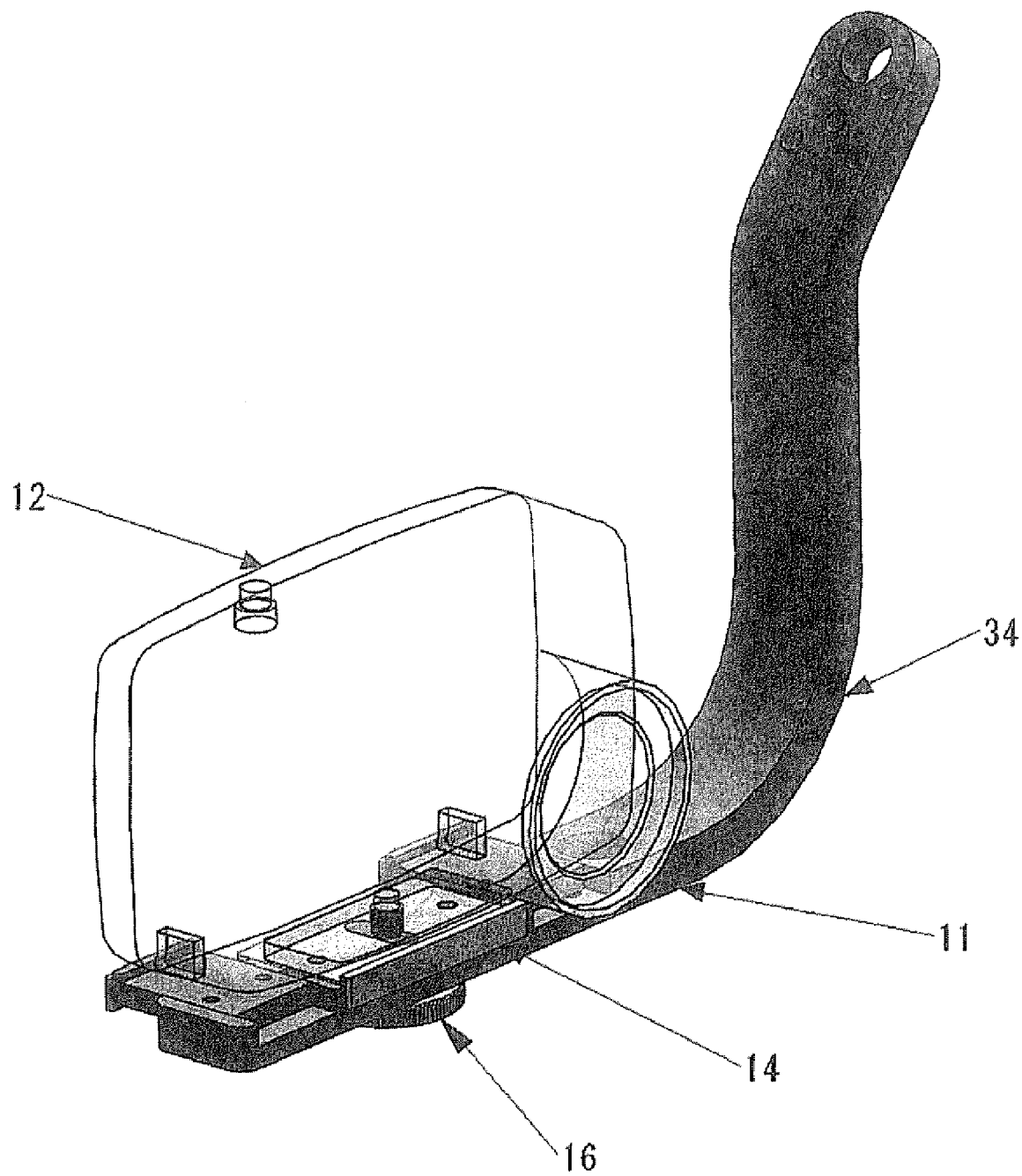
FIG. 13 is a diagonal view of a base for an underwater camera integrated with a grip.

FIG. 13 is a diagonal view of a base 11 for an underwater camera integrated with a grip 34. Such a base may be conveniently selected by the user according to the type and size of the flash lamp to be used and the purpose of the use.

Figure 14:
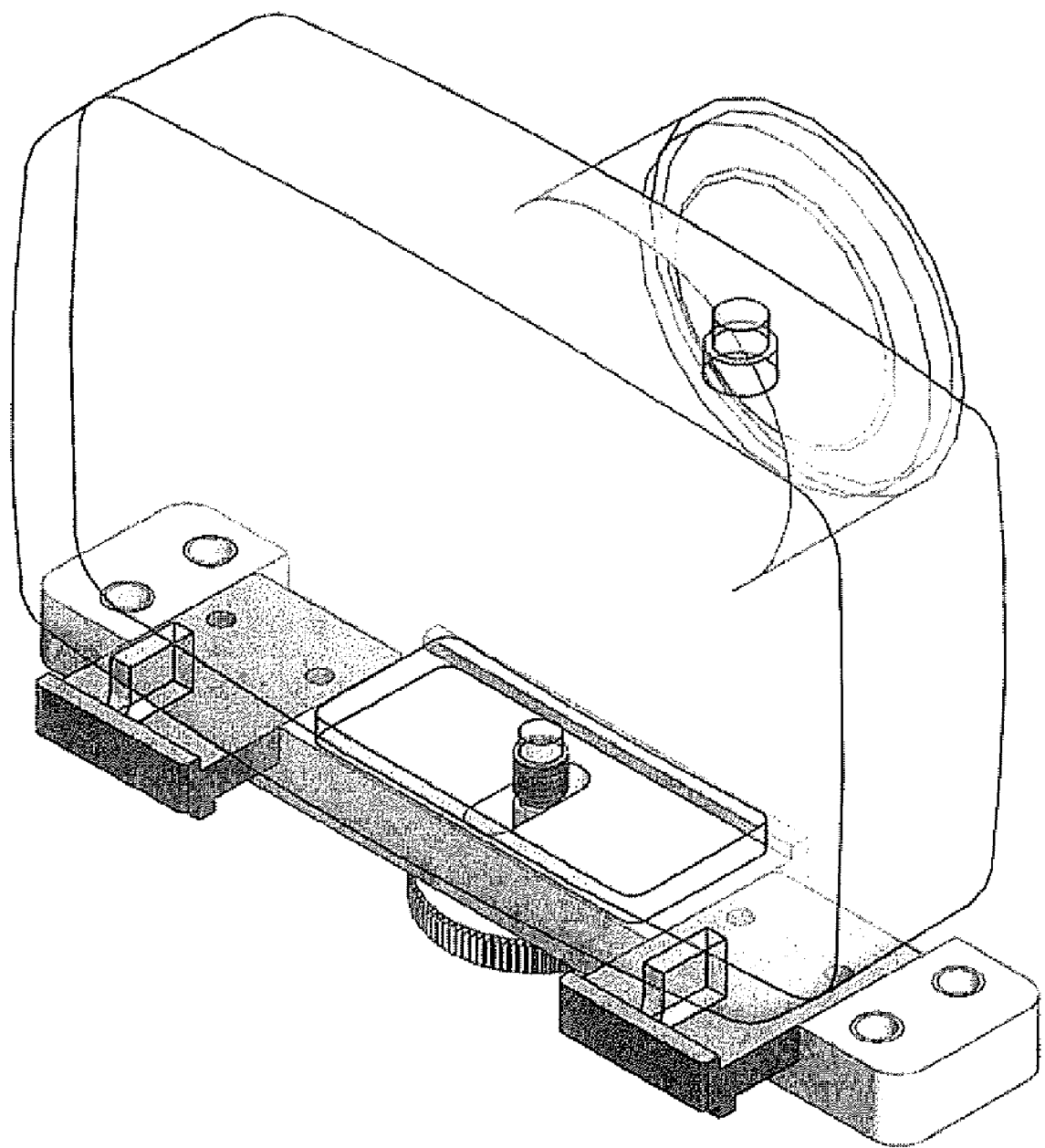
FIG. 14 is a diagonal view for explaining the structure of a base for an underwater camera according to a fourth embodiment of the invention.
Figure 15:
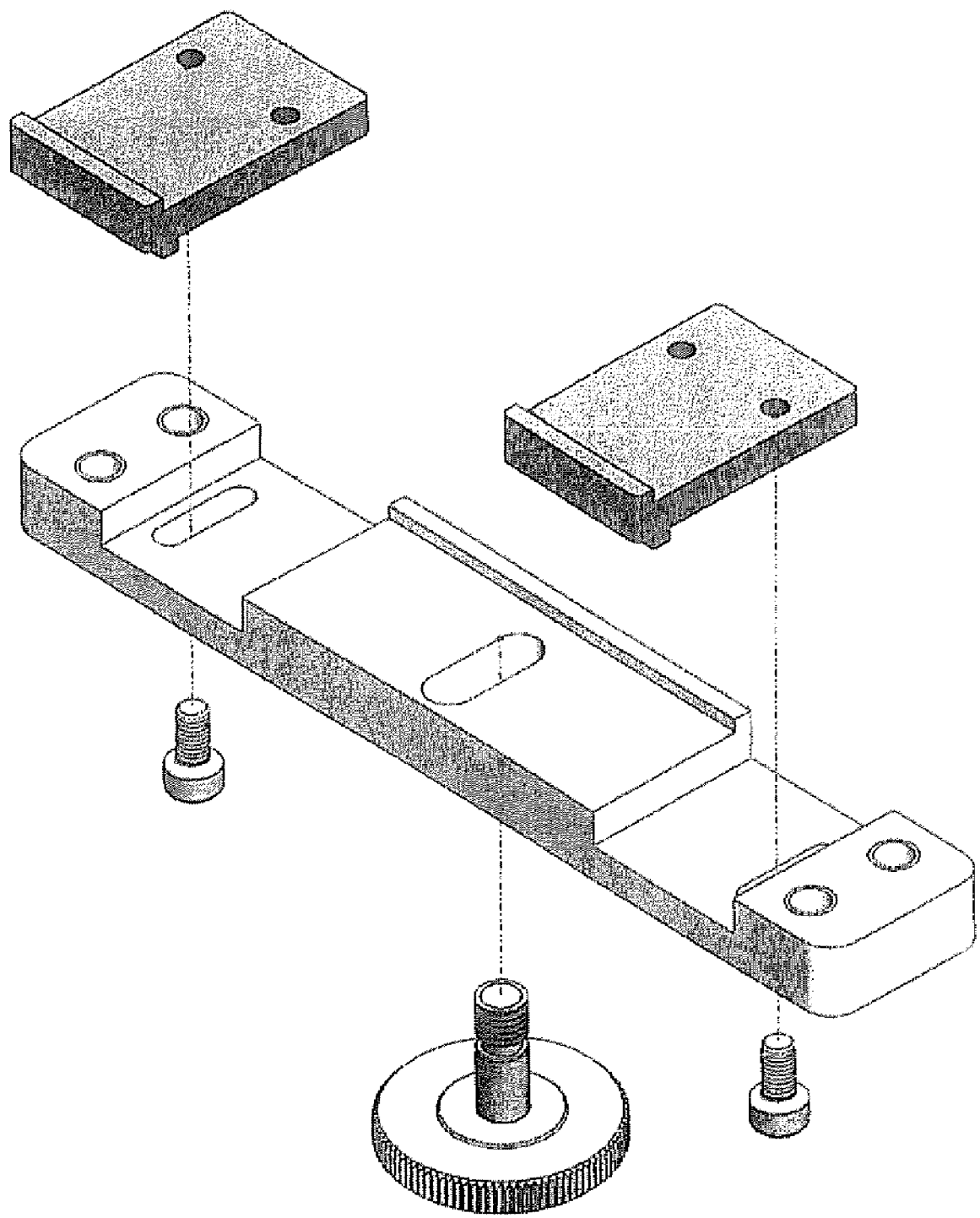
FIG. 15 is an exploded diagonal view of the base of FIG. 14 as seen from above.

Next, a fourth embodiment of the invention is described. FIG. 14 is a diagonal view for explaining the structure of a base for an underwater camera according to the fourth embodiment of the invention, and FIG. 15 is an exploded diagonal view of this base as seen from above. A situation where an arm is attached to the base through a grip will be explained as an example. For the convenience of explanation, the camera main body is not illustrated in FIG. 15 and the grip and the arm are not illustrated in FIGS. 14 and 15.

In these figures, numeral 11 indicates the base, and numeral 12 indicates a watertight camera housing. The base 11 comprises an elongated planar main body 13 and a pair of planar mobile holder plates 41A and 41B which are shorter than the base main body 13 in the longitudinal direction.

The bottom part of the housing 12 is provided with a pedestal 15 for fastening to the base 11 and a pair of leg structures 27A and 27B. A screw hole 17 is formed near the center of this pedestal 15 for accepting a fixing screw 16. This screw hole 17 may be of a type for fastening a tripod screw.

The base main body 13 is formed with an elongated hole 42 for allowing only the axial part of the fixing screw 16 to pass through such that it can be moved in the direction of the width of the base main body 13. Guide grooves 43A and 43B are formed on both sides of the base main body 13 with a shape which is complementary to the shape of a pair of mobile holder plates 41A and 41B. These guide grooves 43A and 43B are provided with elongated holes 30A and 30B, elongated in the direction of the width of the base main body 13, so as to pass set screws 19A and 19B therethrough while allowing them to move in the direction of the width of the base main body 13. Screw holes 21A and 21B for attaching a grip are also provided on both ends of the base main body 13.

The mobile holder plates 41A and 41B are provided with circular fixing holes 44A and 44B, respectively for having the set screws 19A and 19B screwed in. Protrusions 45A and 45B are formed, extending in the longitudinal direction, at one end part in the direction of the width on the surface of the mobile holder plates 41A and 41B so as to contact the front wall of the pedestal 15 of the housing 12 for the purpose of positioning. The housing 12 is fastened by sandwiching the leg structures 27A and 27B with the front walls of the protrusions 45A and 45B of the mobile holder plates 41A and 41B. Moreover, the mobile holder plates 41A and 41B are provided with protrusions 46A and 46B at places somewhat removed inwardly from one end part of the back surface in the direction of the width for contacting, extending in the longitudinal direction so as to contact the front walls of the leg structures 27A and 27B for positioning. When these protrusions 46A and 46B are used for positioning, the mobile holder plates 41A and 41B are turned over upside down, the housing 12 being fastened with the back walls of the protrusions 46A and 46B of the mobile holder plates 41A and 41B pushing and opening the leg structures 27A and 27B wider.

Figure 16:
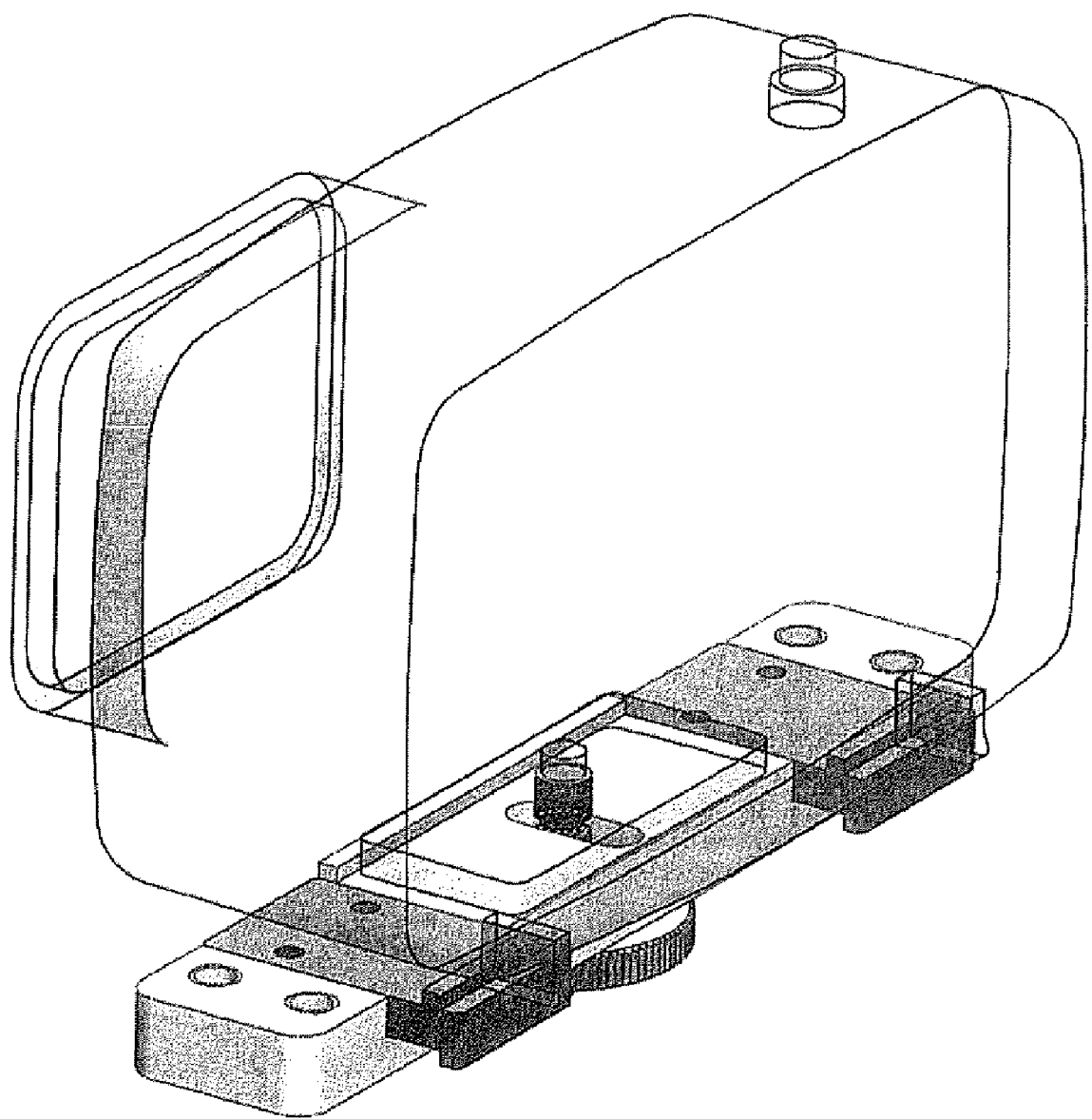
FIG. 16 is a diagonal view of a large camera housing in a fixed condition.

The fixing holes 44A and 44B provided to the pair of mobile holder plates 41A and 41B are preferably throughholes such that any of the protrusions 45A, 45B, 46A and 46B can be used. FIG. 16 shows a large housing 12 in a fastened condition.

Figure 17:
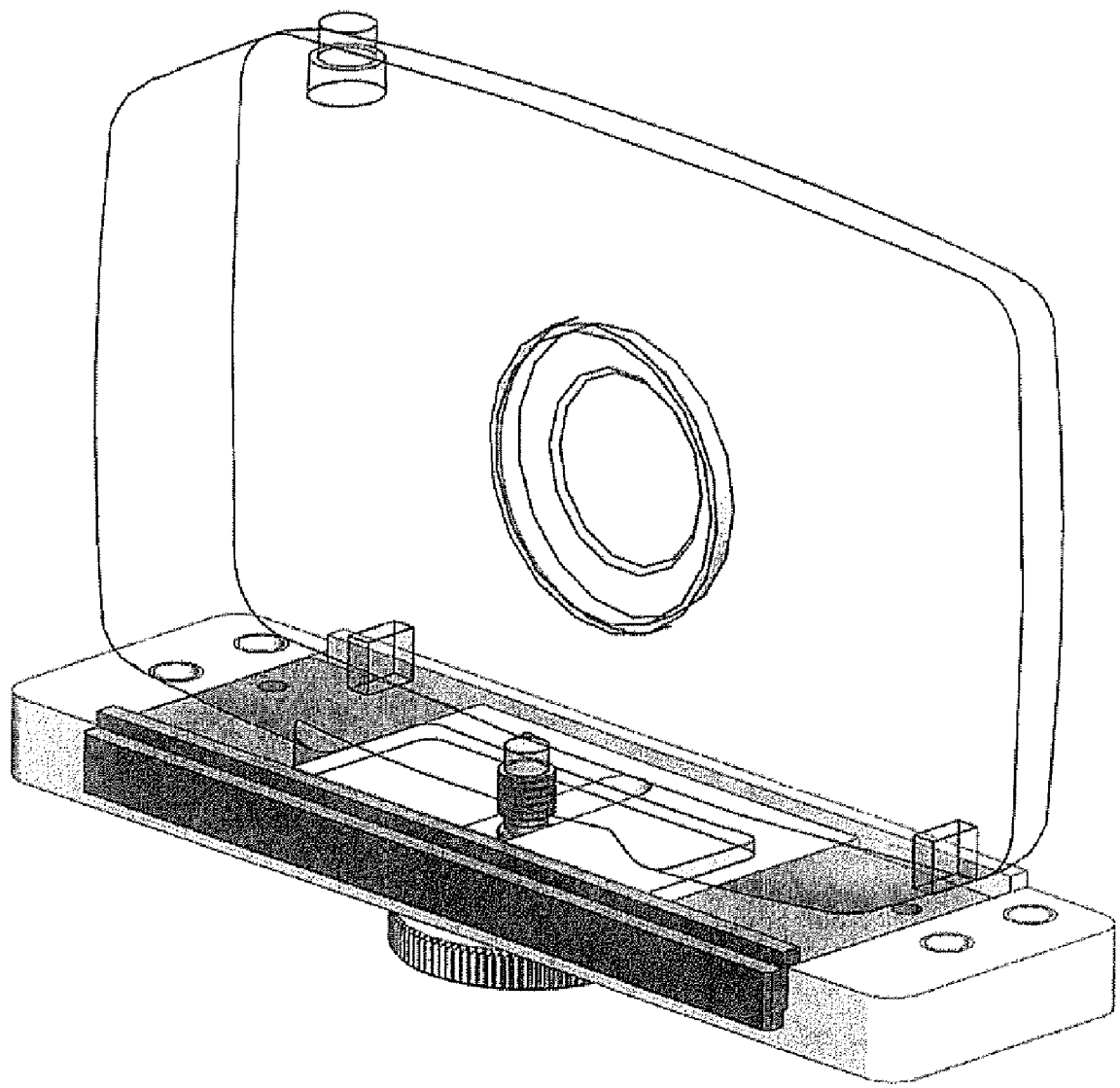
FIG. 17 is a diagonal view for explaining the structure of a base for an underwater camera according to a fifth embodiment of the invention.
Figure 18:
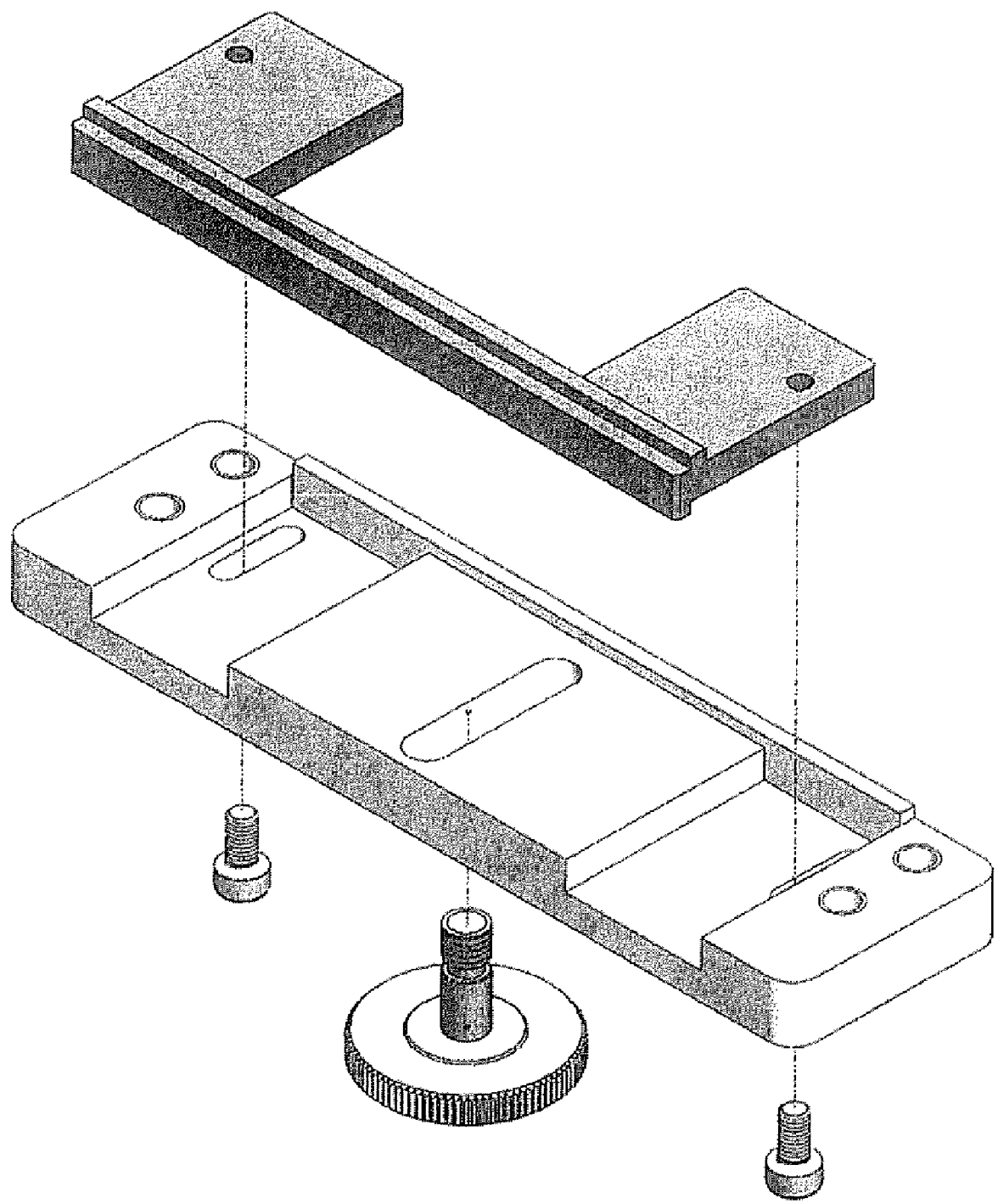
FIG. 18 is an exploded diagonal view of the base of FIG. 17 as seen from above.

Next, a fifth embodiment of the invention is described. FIG. 17 is a diagonal view for explaining the structure of a base for an underwater camera according to the fifth embodiment of the invention, and FIG. 18 is an exploded diagonal view of this base as seen from above. A situation where an arm is attached to the base through a grip will be explained as an example. For the convenience of explanation, the camera main body is not illustrated in FIG. 18 and the grip and the arm are not illustrated in FIGS. 17 and 18.

In FIG. 11, numeral 11 indicates the base, and numeral 12 indicates a watertight camera housing. The base 11 comprises an elongated planar main body 13 and a planar mobile holder plate 14 which is shorter than the base main body 13 in the longitudinal direction.

The base 11 according to this embodiment of the invention is of a structure having a pair of planar mobile holder plates 41A and 41B (as in the fourth embodiment of the invention) connected by a connector 47. Protrusions 48 and 49 are shown as being formed respectively on the front surface and the back surface of this connector 47 but there may be only one of these protrusions present. The base 11 according to the fifth embodiment of the invention is the same as that according to the fourth embodiment of the invention in other respects.

The base 11 according to the fifth embodiment of the invention is fastened as the protrusion 48 is pressed against the pedestal 15 but the position of the housing 12 may be reversed in the forward-backward direction such that it may be fastened as described above.

With the base 11 thus structured, too, the housing 12 can be fastened to the base 11 securely without causing any rotational displacement.

Figure 19:
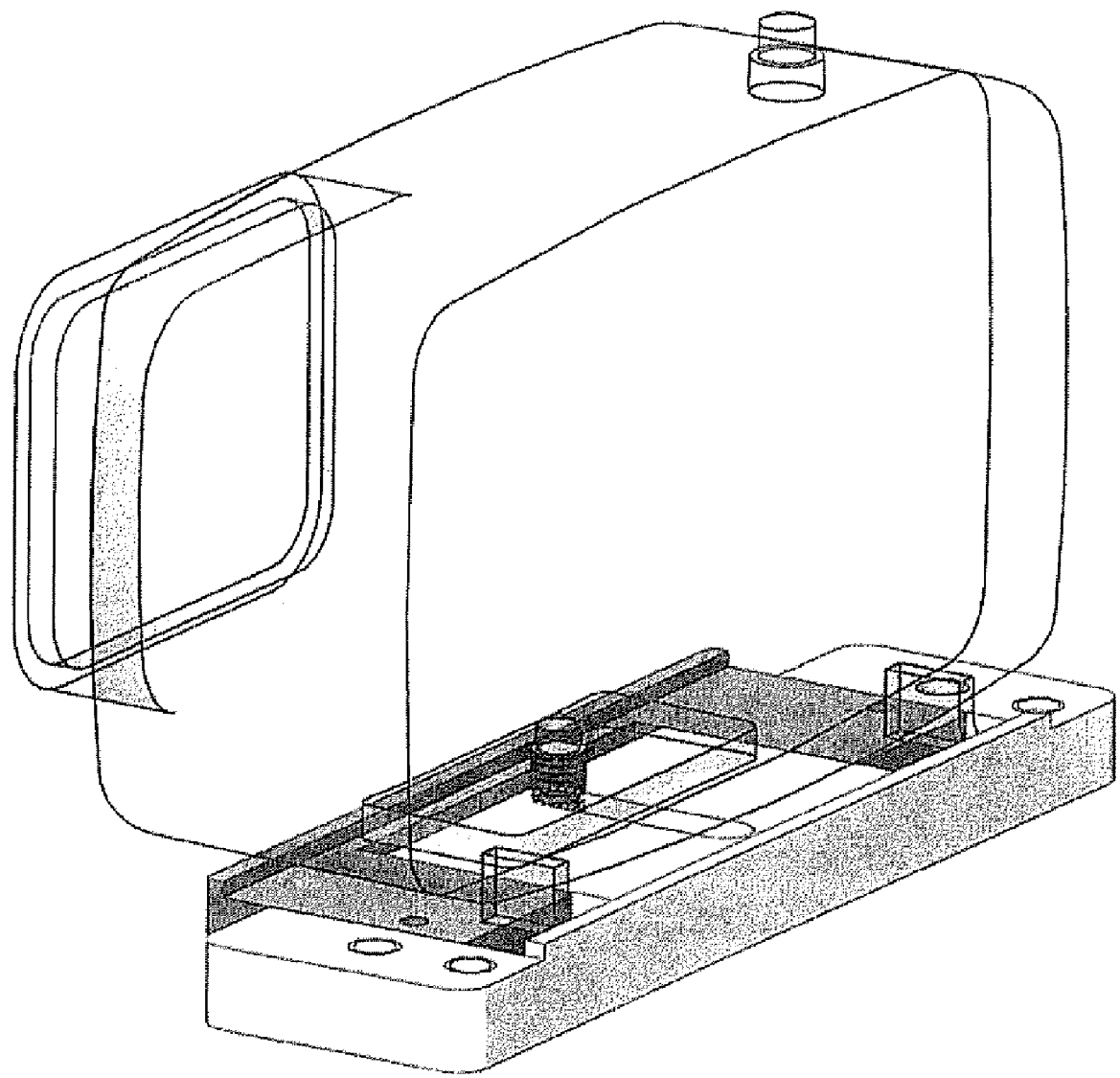
FIG. 19 is a diagonal view of a large camera housing in a fixed condition.

FIG. 19 shows a large camera housing in a fixed condition.

Although the present invention has been described above by way of several embodiments, it goes without saying that they are not intended to limit the scope of the invention and that many modifications and variations are intended to be included within the scope of this invention.

What is claimed is:

1. A base for an underwater camera with a camera enclosed inside a watertight housing, said base serving to have said underwater camera affixed and to attach an arm with a flash lamp provided at a tip part of said arm when flash lighting is carried out, said base comprising:
  a base main body having an elongated planar fixing part where said underwater camera is fastened, said elongated planar fixing part defining a transverse direction;
  a mobile holder plate for fastening said underwater camera, having a protrusion for limiting displacement of said camera housing in said transverse direction and being disposed on said base main body so as to be movable in said transverse direction;
  a pair of set screws for attaching said mobile holder plate to said base main body; and
  a fixing screw for fastening said underwater camera;
  wherein said base main body has a fixing hole for allowing only an axial part of said fixing screw to pass through and a pair of elongated holes formed on both sides of said fixing hole for allowing only axial parts of said set screws to pass through and to be movable in said transverse direction; and
  wherein said mobile holder plate has an elongated fixing hole for allowing the axial part of said fixing screw to pass through and to be movable in said transverse direction and fixing screw holes for engaging with said pair of set screws.

2. The base of claim 1 wherein said base main body has a guide part that guides said mobile holder plate from both sides in said transverse direction.

3. The base of claim 1 further comprising a pair of supplementary mobile holder plates on both sides of said mobile holder plate on said base main body,
  wherein each of said pair of supplementary mobile holder plates has a protrusion on one end part in said transverse direction on a front surface, has an adjusting set screw passed through corresponding one of the elongated holes provided in said transverse direction of said base main body for adjusting its position in said transverse direction and is adapted to be fastened by sandwiching leg structure of said camera housing by inner walls of the protrusions of said pair of supplementary mobile holder plates.

4. The base of claim 3 wherein each of said pair of supplementary mobile holder plates has a backside protrusion on one end part in said transverse direction on a back surface and is adapted to be fastened as outer walls of the backside protrusions push and open the leg structures of said camera housing when said pair of supplementary mobile holder plates is inverted to be attached to said base main body.

5. The base of claim 4 wherein said base main body has supplementary guide parts formed thereon for guiding said pair of supplementary mobile holder plates from both sides in said transverse direction.

6. The base of claim 3 wherein said base main body has supplementary guide parts formed thereon for guiding said pair of supplementary mobile holder plates from both sides in said transverse direction.

7. The base of claim 1 further comprising a pair of supplementary mobile holder plates on both sides of said mobile holder plate on said base main body,
  wherein each of said pair of supplementary mobile holder plates has a protrusion on one end part in said transverse direction on a front surface, has an adjusting set screw passed through corresponding one of the elongated holes provided in said transverse direction of said base main body for adjusting its position in said transverse direction and is adapted to be fastened by sandwiching leg structure of said camera housing by inner walls of the protrusions of said pair of supplementary mobile holder plates.

8. The base of claim 7 wherein each of said pair of supplementary mobile holder plates has a backside protrusion on one end part in said transverse direction on a back surface and is adapted to be fastened as outer walls of the backside protrusions push and open the leg structures of said camera housing when said pair of supplementary mobile holder plates is inverted to be attached to said base main body.

9. The base of claim 8 wherein said base main body has supplementary guide parts formed thereon for guiding said pair of supplementary mobile holder plates from both sides in said transverse direction.

10. The base of claim 7 wherein said base main body has supplementary guide parts formed thereon for guiding said pair of supplementary mobile holder plates from both sides in said transverse direction.

11. A base for an underwater camera with a camera enclosed inside a watertight housing, said base serving to have said underwater camera affixed and to attach an arm with a flash lamp provided at a tip part of said arm when flash lighting is carried out, said base comprising:
  a base main body having an elongated planar fixing part where said underwater camera is fastened, said elongated planar fixing part defining a transverse direction and a protrusion formed at one end part in said transverse direction on a front surface for limiting said camera housing from moving in said transverse direction;

a pair of mobile holder plates disposed on said base main body so as to be movable in said transverse direction, each having a protrusion at one end part on a front surface in said transverse direction;

a set screw for attaching each of said pair of mobile holder plates to said base main body; and a fixing screw for fastening said underwater camera;

wherein said base main body has an elongated fixing hole for allowing only an axial part of said fixing screw to pass through and to be movable in said transverse direction and a pair of elongated setting holes formed on both sides of said elongated fixing hole for allowing only axial parts of said set screws to pass through and to be movable in said transverse direction; and wherein said mobile holder plates each have an elongated fixing screw hole for engaging with said pair of set screws;

said camera housing being adapted to be fastened by sandwiching leg structures of said camera housing with inner walls of the protrusions of said mobile holder plates.

12. The base of claim 11 wherein said base main body has a guide part that guides said mobile holder plate from both sides in said transverse direction.

13. The base of claim 12 wherein each of said pair of mobile holder plates has a backside protrusion on one end part in said transverse direction on a back surface and is adapted to be fastened as outer walls of the backside protrusions push and open the leg structures of said camera housing when said pair of mobile holder plates is inverted to be attached to said base main body.

14. The base of claim 13 further comprising a connecting protrusion that connects the protrusions on said pair of mobile holder plates, said connecting protrusion and the protrusions on said pair of mobile holder plates together serve to fasten said camera housing.

15. The base of claim 12 further comprising a connecting protrusion that connects the protrusions on said pair of mobile holder plates, said connecting protrusion and the protrusions on said pair of mobile holder plates together serve to fasten said camera housing.

16. The base of claim 11 wherein each of said pair of mobile holder plates has a backside protrusion on one end part in said transverse direction on a back surface and is adapted to be fastened as outer walls of the backside protrusions push and open the leg structures of said camera housing when said pair of mobile holder plates is inverted to be attached to said base main body.

17. The base of claim 13 further comprising a connecting protrusion that connects the protrusions on said pair of mobile holder plates, said connecting protrusion and the protrusions on said pair of mobile holder plates together serve to fasten said camera housing.

18. The base of claim 11 further comprising a connecting protrusion that connects the protrusions on said pair of mobile holder plates, said connecting protrusion and the protrusions on said pair of mobile holder plates together serve to fasten said camera housing.

* * * * *